US009164658B2

(12) United States Patent
Sadhvani et al.

(10) Patent No.: US 9,164,658 B2
(45) Date of Patent: Oct. 20, 2015

(54) FLEXIBLE SELECTION TOOL FOR MOBILE DEVICES

(71) Applicant: Cellco Partnership, Basking Ridge, NJ (US)

(72) Inventors: Rita Sadhvani, Watchung, NJ (US); Hannah Y. Moon, Boston, MA (US)

(73) Assignee: Cellco Partnership, Basking Ridge, NJ (US)

( * ) Notice: Subject to any disclaimer, the term of this patent is extended or adjusted under 35 U.S.C. 154(b) by 210 days.

(21) Appl. No.: 13/650,913

(22) Filed: Oct. 12, 2012

(65) Prior Publication Data

US 2014/0109004 A1   Apr. 17, 2014

(51) Int. Cl.
| | |
|---|---|
| G06F 3/033 | (2013.01) |
| G06F 3/048 | (2013.01) |
| G06F 3/0488 | (2013.01) |
| G06F 3/0484 | (2013.01) |
| G06F 3/0482 | (2013.01) |
| G06F 3/01 | (2006.01) |
| G06F 9/44 | (2006.01) |

(52) U.S. Cl.
CPC .............. *G06F 3/0482* (2013.01); *G06F 3/017* (2013.01); *G06F 3/04842* (2013.01); *G06F 3/04883* (2013.01); *G06F 9/4446* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| 2008/0165133 A1* | 7/2008 | Blumenberg et al. ......... 345/173 |
| 2009/0109243 A1* | 4/2009 | Kraft et al. .................... 345/660 |
| 2011/0007029 A1* | 1/2011 | Ben-David .................... 345/174 |
| 2011/0080341 A1* | 4/2011 | Helmes et al. ................ 345/163 |
| 2011/0173533 A1* | 7/2011 | Liu et al. ....................... 715/702 |
| 2012/0044179 A1* | 2/2012 | Hudson ......................... 345/173 |
| 2013/0155308 A1* | 6/2013 | Wu et al. ................... 348/333.05 |

OTHER PUBLICATIONS

Google™, "Android 3.1 User's Guide" Android™ mobile technology platform 3.1, Creative Commons Attribution 3.0 License Edition, AUG-3.1-CC-100, pp. 132-133 (Apr. 15, 2011).
Apple Inc. "iPhone User Guide for iOS 4.2 and 4.3 Software" pp. 39-40 (2011).

* cited by examiner

*Primary Examiner* — Boris Pesin
*Assistant Examiner* — Nhat-Huy T Nguyen

(57) ABSTRACT

In one aspect, a method is provided for providing a flexible content selection capability for selecting a specific portion of content displayed on a touch-screen display of a user's computing device. In response to receiving user input including a plurality of touch points detected within a content display area of the touch-screen display, a relative location of each detected touch point is determined with respect to the content display area. Content displayed within a portion of the first content display area of the touch-screen display is automatically selected based on the determined relative locations of the plurality of detected touch points. A content selection region including the selected content is graphically presented within the content display area. A context menu including user options for invoking functions related to the selected content is then displayed in association with the content selection region via the touch-screen display.

20 Claims, 5 Drawing Sheets

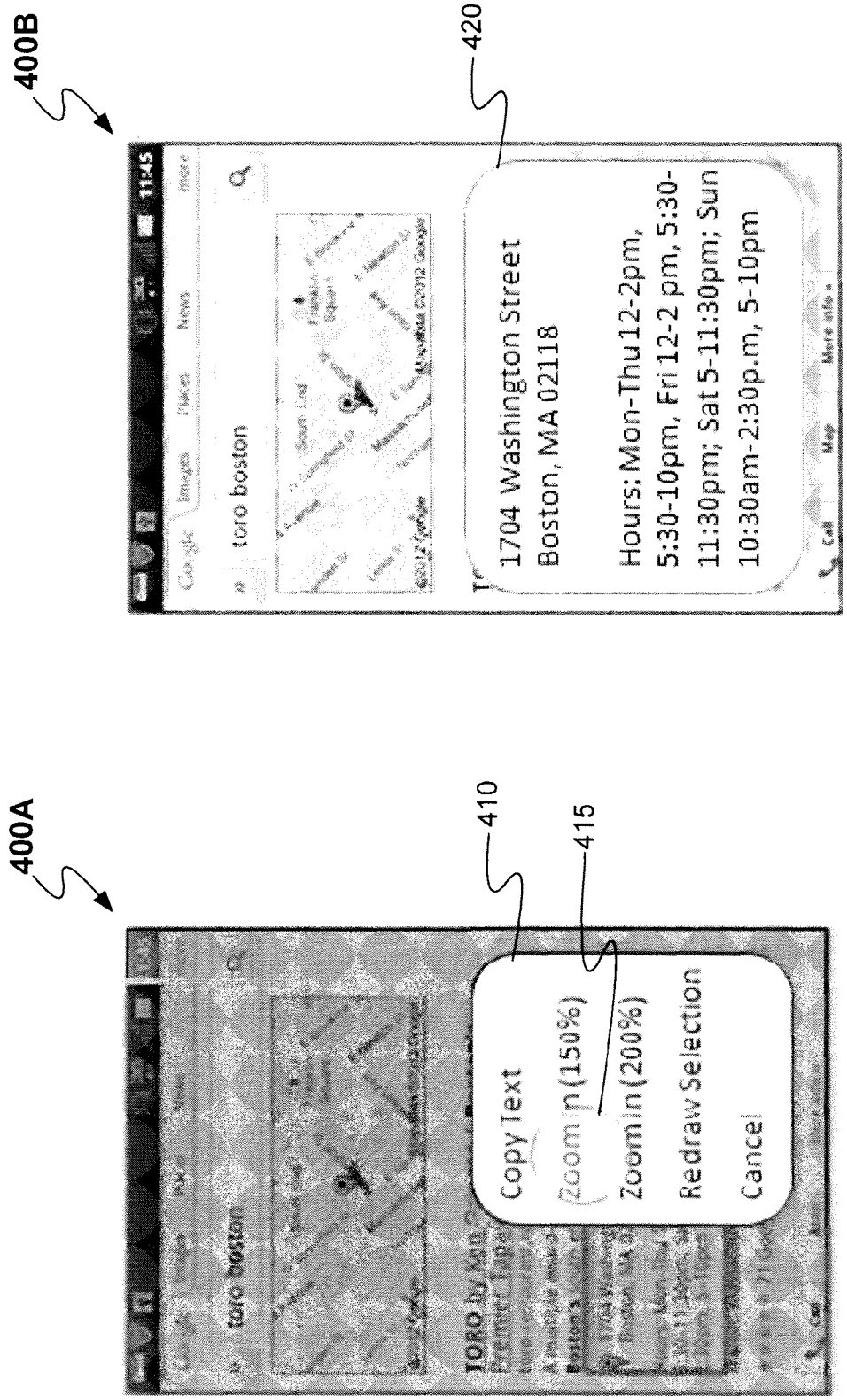

FLEXIBLE SELECTION TOOL FOR MOBILE DEVICES

BACKGROUND

The advancement of mobile communication devices and networks in recent years has allowed users of such devices to view different types of content directly on the users' mobile devices. Examples of such content include, but are not limited to, text, media and graphics content. Such content is generally displayed to a user via a display screen of the user's mobile device by a content-specific software application (e.g., a media player for viewing video content) or a general-purpose application (e.g., a web browser for viewing web page content) executable at the device. Many of the mobile devices in production today include touch-screen displays. A user's mobile device with a touch-screen display enables the user to manipulate the content being viewed. The touch-screen display allows the user to interact directly with the displayed content by "touching" the display (e.g., using a finger or stylus) in order to perform various functions. For example, the user may use different touch gestures to select and view portions of the displayed content including, for example, text content that may be selected for a copy and paste function.

To allow portability and handheld operations, many mobile devices generally have small display screen sizes and thus, provide a limited screen area for users to view and manipulate the content being displayed. As a result, user experience may suffer for mobile device applications in which certain types of content are displayed. In the copy and paste example above, the user may have difficulty selecting and copying the specific portions of text within a document or web page being displayed on the screen of the device due to the relatively small font size of the text being displayed on the device. Further, conventional techniques for selecting a portion of displayed text content can become a very cumbersome manual process for the user as such a technique may require a substantial amount of dexterity to appropriately select the specific portion intended by the user, depending on the size of the display screen and the amount of content being displayed.

Many devices offer the user the option of enlarging the displayed content by increasing the font size or the level of zoom. However, the increased zoom level or magnification is applied to the displayable content or content viewing area of the display screen as a whole, rather than just the portion of interest to the user. As such, the user may lose perspective or awareness of the location of the magnified portion of the displayable content relative to the content in its entirety. This may lead to inefficiencies and user frustration from having to continuously manipulate or change the size and or position of the content being viewed in order to find different portions of content that may be of interest.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4A-4B illustrate different views of the exemplary touch-screen user interface for selecting different zoom levels for only the content displayed within the selected area of the touch-screen display.

DETAILED DESCRIPTION OF PREFERRED EMBODIMENTS

Figure 1:
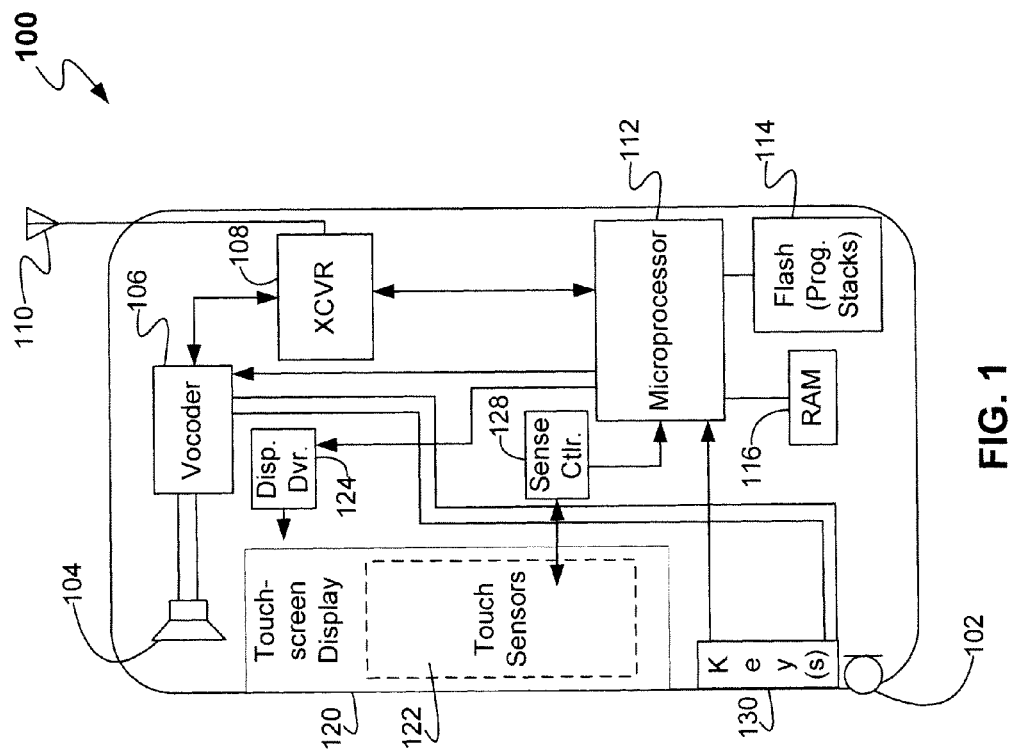
FIG. 1 is a high-level functional block diagram of an exemplary mobile device for providing a flexible content selection capability for selecting and enlarging a specific portion of content displayed in an area of a touch-screen display of the device, without enlarging all of the displayable content with respect to the screen as a whole.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The technologies disclosed herein provide a flexible content selection capability for selecting a specific portion of content displayed on a touch-screen display of a user's computing device and enabling the user to invoke various functions related to the selected content. One example of such a function is a zoom-in function to enlarge the selected content (e.g., by increasing a zoom level at which the selected content is currently displayed on the touch-screen display, without enlarging all of the displayable content in its entirety. Examples of other functions that may be enabled for the user include, but are not limited to, a copy/cut function (e.g., to copy/cut and paste at least a part of the selected content into different applications) and a zoom-out function (e.g., to decrease the zoom level at which the selected content is currently displayed). In an example, the user's device is a mobile device (e.g., mobile handset or smart-phone). The terms "touch-screen display" and "touch-screen" are used interchangeably herein to refer to any electronic display device for visually displaying or rendering different types of content (e.g., text, media or graphics) and also, for receiving or detecting user input based on the presence and location of a "touch" within a content area of the display. Such a "touch" is detected by the touch-screen when, for example, the user physically places one or more finger(s) or other input device, e.g., a compatible stylus, onto or sufficiently near (e.g., within a predetermined distance) from the surface of the touch-screen. The flexible content selection features of the user's device may be initially activated in various ways. For example, a user option to activate these features may be provided in a general configuration or settings panel of the device (or operating system thereof). Enabling this option may, for example, configure the touch-screen display of the device to detect the appropriate touch-gestures for invoking the flexible content selection functionality, as will be described in further detail below. However, it is noted that the flexible content selection functionality may be activated in any of various ways based on different types of user input (e.g., activation based on motion of the physical device itself, as detected by an accelerometer of the device) as desired for a particular implementation.

In a further example, the flexible content selection capability includes automatically providing a content selection region for selecting a specific portion of the displayed content in a content display area of a graphical user interface (GUI) provided via the touch-screen display, based on multiple static touch positions. In some implementations, the boundary or outline of the selection region is generated or drawn automatically when the touch positions are detected by the touch-screen (e.g., remain static) for a predetermined period of time. In an example, the selection region is a selection box in the shape of a square or rectangle encompassing the portion of displayed content that appears between the detected touch positions. The touch positions may correspond to, for example, two or more of the user's fingers that are in contact with the touch-screen display. Thus, to select a line of text displayed on the touch-screen, the user may position one finger (e.g., thumb) near the start of the line (e.g., before the first character) and a second finger (e.g., index finger) at the end of the line (e.g., after the last character), and a selection region (or box) may be generated or drawn automatically around the line of text (e.g., after a predetermined period of time has elapsed).

Additionally, the user can manually "draw" a boundary or outline of a selection region by moving one finger (e.g., index finger) along the surface of the touch-screen display. Once an area of the display screen is selected in this manner, a user can initiate various functions related to the content displayed in the selected area of the screen including, for example and without limitation, increasing the zoom level (e.g., "zoom in") or enlarging text content to make it easier to view and manipulate or, as described above, selecting a portion of the text content to copy and paste the selected portion into different applications. For the above-described zoom-in function, only the content in the selected area of interest (e.g., within the selection region) is enlarged. As such, the subject technology provides a more efficient and easier way for mobile device users to select and view specific portions of content displayed on a touch-screen display relative to conventional solutions.

While the examples provided herein are described in the context of a mobile device, it is noted that the subject technology described herein may be applied to other types of computing devices configured to receive user input via a touch-screen display integrated with or coupled to each device. Such other computing devices may include, for example and without limitation, a desktop or laptop computer. An example of such a computing device will be described further below with respect to FIG. 5. However, due to the relatively small size of the display screens and limited content viewing areas of mobile devices, the subject technology may improve user experience for users of mobile devices in particular. Also, it should be noted that the subject technology is not intended to be limited to capacitive touch-screens and can be used with a variety of different touch-screen technologies.

Reference now is made in detail to the examples illustrated in the accompanying drawings and discussed below. FIG. 1 is a high-level functional block diagram of an example mobile device 100 in which portions of the subject technology may be implemented. In the example of FIG. 1, mobile device 100 is in the form of a mobile handset including a touch-screen display. Examples of touch-screen type mobile devices that may be used to implement mobile device 100 may include, but are not limited to, a smart phone, personal digital assistant (PDA), tablet computer or other portable device. However, the structure and operation of the touch-screen type mobile device 100 is provided by way of example, and the subject technology as described herein is not intended to be limited thereto. It should be appreciated that the disclosed subject matter may be implemented using any computing device having a touch-screen display, including capabilities to receive user input via such display so as to enable a user to directly interface with the content being displayed.

For purposes of discussion, FIG. 1 provides a block diagram illustration of an exemplary mobile device 100 having a touch-screen display for displaying content and receiving user input. In the example shown in FIG. 1, mobile device 100 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

Also, as shown in FIG. 1, mobile device 100 includes at least one digital transceiver (XCVR) 108, for digital wireless communications, although the mobile device 100 may include additional digital or analog transceivers (not shown) conforming to various digital wireless communication standards. Examples of such transceivers include, but are not limited to, GPS, WiFi, IrDA and Bluetooth. In an example, transceiver 108 provides two-way wireless communication of information including, but not limited to, speech or other audio signals captured by microphone 102 and encoded by vocoder 108 in addition to other types of digital information, in accordance with the technology of a wireless or mobile communication network. Transceiver 108 also sends and receives a variety of signaling messages in support of various voice and data services provided by a network of a wireless service provider to a user of mobile device 100 via the mobile communication network. Transceiver 108 connects through radio frequency (RF) send-and-receive amplifiers (not separately shown) to an antenna 110. Transceiver 108 may also support various types of mobile messaging services, such as short message service (SMS), enhanced messaging service (EMS) and/or multimedia messaging service (MMS).

Mobile device 100 further includes a microprocessor (or "processor") 112, which serves as a programmable controller for mobile device 100 by configuring mobile device 100 to perform various operations, for example, in accordance with instructions or programming executable by processor 112. Such operations may include, for example, various general operations of mobile device 110 as well as operations related to the flexible content selection capability described herein. A flash memory 114 is used to store, for example, programming or instructions related to the flexible content selection functionality described herein. Flash memory 114 may also be used to store mobile configuration settings for different mobile applications or services executable at mobile device 100 (using processor 112). Mobile device 100 may also include a non-volatile random access memory (RAM) 116 for a working data processing memory. Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to embody aspects of the flexible content selection functionality, as described herein. Program aspects of the technology may be thought of as "products" or "articles of manufacture" typically in the form of executable code or process instructions and/or associated data that is stored on or embodied in a type of machine or processor readable medium.

In the example shown in FIG. 1, the user interface elements of mobile device 100 include a touch-screen display 120 (also referred to herein as "touch-screen 120" or "display 120").

For input purposes, touch-screen display 120 includes a plurality of touch sensors 122. Other interface elements may include a keypad including one or more keys 130. For example, the keypad may be implemented in hardware as a T9 or QWERTY keyboard of mobile device 100 and keys 130 may correspond to the physical keys of such a keyboard. Alternatively, keys 130 (and keyboard) of mobile device 100 may be implemented as "soft keys" of a virtual keyboard graphically represented in an appropriate arrangement via touch-screen display 120. The soft keys presented on the touch-screen display 120 may allow the user of mobile device 100 to invoke the same user interface functions as with the physical hardware keys. In some implementations, the microphone 102 and speaker 104 may be used as additional user interface elements, for audio input and output, including with respect to some functions related to the flexible content selection capability, as described herein.

For output purposes, touch-screen display 120 is used to present information (e.g., text, video, graphics or other content) to the user of mobile device 100. Processor 112 controls touch-screen display 120 via a display driver 124, to present visible outputs to the device user.

In general, touch-screen display 120 and touch sensors 122 (and one or more keys 130, if included) are used to provide the textual and graphical user interface for the mobile device 100. In an example, touch-screen display 120 includes a content display area for providing viewable content to the user at mobile device 100. Touch-screen display 120 also enables the user to interact directly with the viewable content provided in the content display area.

In some implementations, touch-screen display 120 is a capacitive touch-screen display and touch sensors 122 are independent capacitors arranged as a grid and disposed at various points throughout a transparent conductive material (e.g., indium tin oxide) that is layered onto a hard surface composed of insulating material (e.g., glass). For example, the respective locations of touch sensors 122 (e.g., capacitors) may correspond to different intersection points of a matrix of rows and columns of the layered conductive material. Alternatively, touch sensors 122 may include a grid of capacitive electrodes formed of one or more layers of transparent conductive material etched onto a sheet of hard insulating material, as described above. However, it should be noted that touch-screen display 120 is not limited to either of the above-described implementations. Accordingly, touch-screen display 120 may be implemented using any of various conventional or other techniques based on, for example, the type of capacitive touch-screen technology desired for a particular implementation. User input includes touch of the display device with the user's finger, stylus or similar type of peripheral device used for user input with a touch-screen. When current is applied to touch-screen display 120, user input can be detected by touch sensors 122 based on a measurable change (e.g., reduction) in mutual capacitance based on measurable changes in capacitance and voltage at one or more individual sensor locations corresponding to the physical point(s) of contact of the user's finger(s) or conductive stylus with respect to touch-screen display 120.

As shown in FIG. 1, mobile device 100 also includes a sense circuit 128 coupled to touch sensors 122 for detecting the occurrence and relative location/position of each touch with respect to a content display area of touch-screen display 120. In this example, sense circuit 128 is configured to provide processor 112 with touch-position information based on user input received via touch sensors 122. In some implementations, processor 112 is configured to correlate the touch position information to specific content being displayed within the content display area on touch-screen display 120. The touch-position information captured by sense circuit 128 and provided to processor 112 may include, but is not limited to, coordinates identifying the location of each detected touch with respect to the content display area of touch-screen display 120 and a timestamp corresponding to each detected touch position.

The information provided by sense circuit 128 may include, for example, a series of different locations of touch points/positions detected across the content display area of touch-screen display 120 over a predetermined period of time. The location and time information for a series of continuous touch points/positions can be used by processor 112 to track the movement of the user's finger(s) (or other input device) across touch-screen display 120. This information also may be used to track various parameters including, but not limited to, the direction and speed of finger movement based on changes between the different touch positions over time. The information tracked by sense circuit 128 is used by processor 112 to detect different types of touch gestures for performing different operations in accordance with each gesture.

As will be described in further detail below, the user can use different touch gestures to select specific portions of the viewable content via touch-screen display 120 in order to initiate various functions. Such touch gestures may include, for example, touch gestures involving a single touch point (e.g., single press of the user's finger) or a series of touch points (e.g., continuous movement of the user's finger) detected via touch-screen display 120. Such touch gestures may further include multi-touch gestures involving multiple touch points, where each touch point corresponds to, for example, a different finger of the user (e.g., two different touch points corresponding to the user's thumb and index fingers in contact with touch-screen display 120). In an example, mobile device 100 implements a mapping between different touch gestures that may be detected via touch-screen display 120 and different functions/operations for processor 112 to perform. In some implementations, the functions and relevant gesture mapping may be part of programming (e.g., for an application) stored in the flash memory 114, which can be read and executed by processor 112 to perform the desired function corresponding to a detected touch gesture.

The particular function performed by processor 112 in response to a detected touch gesture may be based on the particular context at the time the touch gesture is detected. For example, the flexible selection functionality described herein may be implemented as a device or system-level feature associated with mobile device 100 or its mobile operating system, where such functions have global scope and can be used across multiple applications executable at mobile device 100. Alternatively, the flexible selection functionality may be implemented as a feature provided by one or more application programs executable at mobile device 100, where the scope of this functionality may be provided during the execution of an application program having such a feature. In the case of an application program feature, the touch gestures may be predetermined (e.g., by an application developer) for a particular application or may be customized by the user, e.g., as options in a preference or settings panel of a graphical user interface of mobile device 100.

In some implementations, the flexible content selection functionality is invoked only once a predetermined period of time (e.g., 501 milliseconds) has elapsed after at least two touch points have been detected by touch-screen display 120 (using touch sensors 122 and sense circuit 128). In an example, the touch points detected correspond to two of the user's fingers pressed against touch-screen display 120 for a time longer than the predetermined time period. The predetermined period of time may correspond to, for example, a threshold period of time defined for mobile device 100 (e.g., by the operating system) to represent a "long press" by the user.

As will be described in further detail below in the examples of FIGS. 2A-2B, 3A-3B and 4A-4B, the flexible selection functionality is implemented as part of a GUI provided to the user at mobile device 100 via touch-screen display 120. Further, the flexible content selection functionality may be implemented at the operating system level of the mobile device 100 so as to have global scope for use in multiple applications. Alternatively, the flexible content selection functionality may be implemented at the application level and therefore, have a scope that is specific to a particular application. In an example, the flexible selection function operates in conjunction with other touch-gesture based functions of the operating system or application executable at mobile device 100, and in some implementations, the flexible selection function may override or replace a default behavior or a predetermined function (of the operating system or application), for example, when the same touch gesture may be associated with each of the different functions. Examples of touch gestures used to invoke the flexible selection function will be described in further detail below.

Figure 2B:
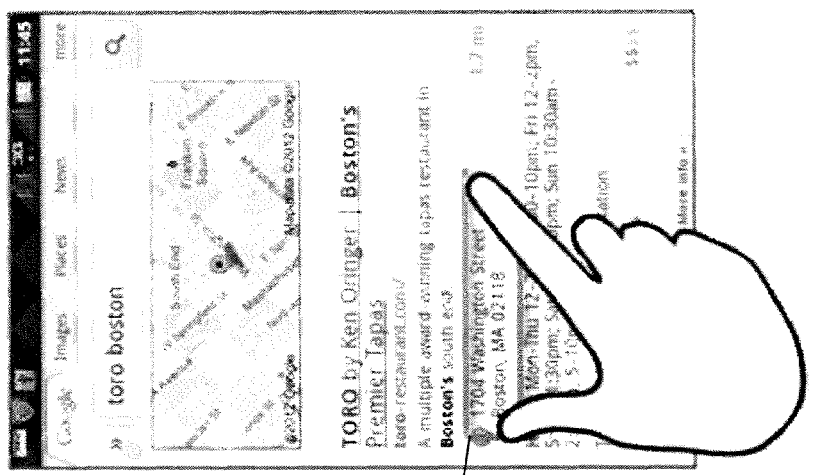
FIGS. 2A-2B illustrate different views of an exemplary graphical user interface of a touch-screen display for selecting specific content displayed within a selection region generated automatically based on static positions of a user's fingers on the touch-screen.
Figure 2A:
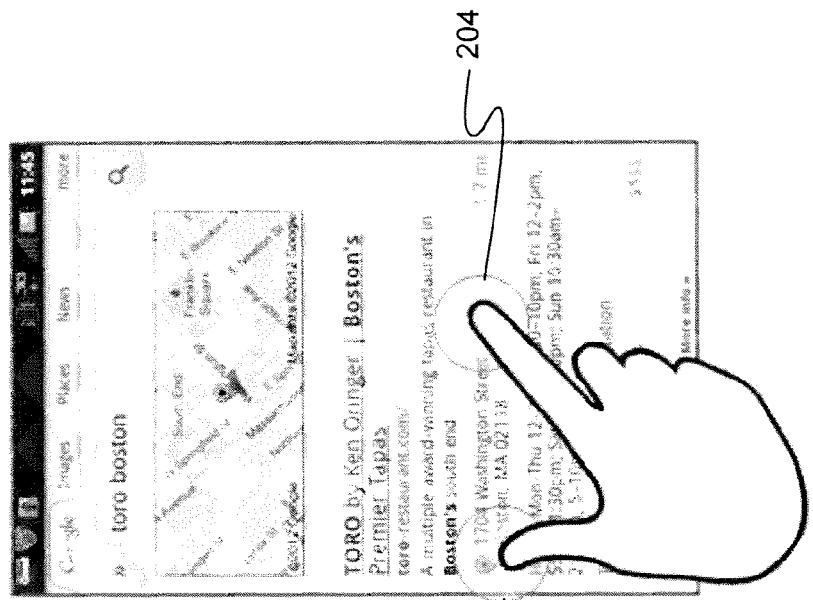

FIGS. 2A and 2B illustrate different views of an exemplary GUI 200 including a content display area of a touch-screen display of a mobile device (e.g., mobile device 100 of FIG. 1, as described above). As shown in FIGS. 2A and 2B, the different views are illustrated using a GUI 200A and a GUI 200B, respectively. As will be described in further detail below, GUIs 200A and 200B may be used to automatically display a graphical representation of a content selection region based on multiple static touch points detected by the touch-screen display. For purposes of discussion, GUI 200A and GUI 200B will be described using mobile device 100 of FIG. 1, as described above. Thus, for example, GUIs 200A and 200B may be provided for a user of mobile device 100 via touch-screen display 120, as described above. However, the touch-based flexible selection techniques described herein are not intended to be limited thereto and thus, may be implemented using another mobile device or other type of computing device, e.g., desktop computer or workstation having a touch-screen display, as noted previously. Also, for purposes of discussion, GUIs 200A and 200B are described in the context of a mobile web browser application executable at the user's device (e.g., mobile handset). However, it is noted that the techniques described herein are not intended to be limited thereto, and that these techniques may be implemented for any of various types of applications executable at the user's device.

In the example shown in FIGS. 2A-2B, the different views corresponding to GUI 200A and GUI 200B demonstrate different steps in a user process flow for creating an automatic content selection region based on static touch points via the touch-screen display. FIG. 2A may represent, for example, an initial step of the user process flow. The user in this example can use touch gestures and invoke the flexible selection functionality in order to enlarge or increase the zoom level of a specific portion of the content being displayed via GUI 200A. In this example, GUI 200A is implemented for a web browser application executable at the user's mobile device, and the user may be using the web browser to search for a street address of a nearby restaurant, e.g., by submitting a search query including the name of the restaurant to a search engine accessible via the web browser. The web browser causes the mobile device to then display via GUI 200A a list of search results returned by the search engine including, for example, the address and other relevant information (e.g., description of the restaurant, reviews, a map showing nearby restaurant location(s), etc.) via the touch-screen display.

However, due to the relatively small size of the touch-screen display of the user's device, the user may have difficulty properly viewing the address information or other content being displayed. As such, the user can use the flexible selection functionality to expand or increase the zoom level of the area of the touch-screen display corresponding only to the specific portion of the content of interest (e.g., the address), without enlarging the other content being displayed. The user specifies the content of interest (e.g., the address) by positioning a finger on either side of the content, as displayed in an area of the touch-screen display. In the example shown in FIG. 2A, the content (e.g., address) that the user is interested in selecting and expanding/enlarging corresponds to an area of the display between touch points 202 and 204. Touch points 202 and 204 correspond to the positions of the user's fingers (e.g., thumb and index finger), as detected by the touch sensors of the touch-screen display (e.g., touch sensors 122 of touch-screen display 120 of FIG. 1, as described above).

As shown in FIG. 2B, a content selection region 210 is graphically presented as a bounding box surrounding a portion of the displayed content based on the detected touch points 202 and 204. However, it should be noted that the selection region is not intended to be limited to box shapes and any shape may be used to represent the selection region, as desired for a particular implementation. In this example, touch points 202 and 204 are used to approximate the boundary or outline of content selection region 210 and the relevant content being selected. For example, touch points 202 and 204 may correspond to different reference points (e.g., at opposite ends) of selection region 210. Such reference points may depend on the particular shape used to graphically represent the selection region in the content display area (e.g., via GUI 200B) of the touch-screen display. In the example shown in FIG. 2B, touch points 202 and 204 correspond to corner positions (e.g., lower left-hand and upper right-hand corners, respectively) of selection region 210 to be displayed in the shape of a square or rectangle. In a different example, touch points 202 and 204 may correspond to the respective midpoints of opposite sides of the bounding box representing selection region 210. In either example, touch points 202 and 204 may be used to approximate the size and location of the selection region to be displayed with respect to the content display area of the touch-screen display. Therefore, the respective locations of touch points 202 and 204 may not necessarily correspond to precise reference point locations (e.g., exact corners or midpoints of the bounding box in this example) at different ends of the boundary of the selection region.

In some implementations, content selection region 210 is graphically represented or drawn automatically via GUI 200B only after touch points 202 and 204 remain static or have been detected by the touch-screen display without any (or with minimal) movement for a predetermined period of time. Additionally, a predetermined minimum size may be defined for content selection region 210 before it is graphically represented via the touch-screen display. This may require that the detected touch points 202 and 204 be spaced apart at a predetermined minimum distance from each other. Thus, for example, any detected touch points that are spaced apart less than the predetermined minimum distance would not be recognized as valid user input with respect to content selection region 210. This may allow any touch points detected as a result of incidental contact with the touch-screen display to be ignored for purposes of the flexible content selection functionality described herein. Further, a graphical representation of content selection region 210 (or a boundary thereof) may be presented based on the determined relative locations of touch points 202 and 204 with respect to the content display area of the touch-screen display of the mobile device. This may include, for example, automatically selecting the content that should be included within the content selection region 210 to be displayed. In an example, the content displayed within a portion of the content display area of the touch-screen display is selected based on the determined relative locations of touch points 202 and 204. As described above, touch points 202 and 204 are used to approximate the boundary (and size and location) of content selection region 210. Similarly, touch points 202 and 204 may be used to approximate the specific content that should be selected, e.g., the portion of the displayed content that user intended to select or include within content selection region 210.

In an example, the boundary of content selection region 210 that is approximated from touch points 202 and 204 may cover only a portion (e.g., only one half) of a single content item (e.g., a single image or text character). Rather than dividing the content item and including only a portion within content selection region 210, the size of content selection region 210 may be, for example, adjusted to either exclude or include the content item as a whole. The determination of whether to exclude or include such a content item (e.g., by decreasing or increasing the size of content selection region 210, respectively) may be based on, for example, the amount (or percentage) of the content item that is covered by the initially approximated boundary of content selection region 210. In some implementations, the content item is included only when the portion of the content item covered initially by the boundary of content selection region 210 is greater than a predetermined threshold amount or percentage relative to the content item as a whole. If the covered portion of the content item in this example is below the predetermined threshold amount, the particular content item may be ignored or excluded from the selected content for content selection region 210. This may be an alternative to adjusting (e.g., decreasing) the size of content selection region 210 to be graphically displayed via GUI 200B on the touch-screen display. In some implementations, the inclusion of a partial content item within content selection region 210 may be dependent upon whether or not another content item of the same type has been included already within content selection region 210. For example, the content item may be a hyperlink (e.g., in the form of a Uniform Resource Locator (URL) associated with a web page) that is only partially included within content selection region 210. In this example, if other hyperlinks were also included (either partially or as a whole) within content selection region 210, the size of content selection region 210 may be automatically resized so as to include the entire hyperlink as part of the selected content within content selection region 210. Further, such resizing may be performed even when the resized content selection region 210 would include a relatively greater amount of selected content than would be included otherwise, e.g., if no other hyperlinks were included within the initially approximated content selection region 210. However, it should be noted that the resizing of content selection region 210 is limited to known content types, e.g., where each known content type is predefined in a list of content types for GUI 200B. Once selection region 210 is presented for the selected content displayed within the content display area of the touch-screen display, the user may modify the size, shape and/or location of the selection region 210 by changing the locations of touch points 202 and 204 by moving the user's fingers while maintaining contact with the touch-screen display.

If the user is satisfied with selection region 210 or believes that selection region 210 includes selected content as desired by the user, the user can invoke various functions related to the selected content. As will be described in further detail below, the various functions may correspond to different user-selectable options displayed in a context menu of GUI 300A via the content display area of the touch-screen display. For example, the context menu may be displayed once touch points 202 and 204 are no longer detected, e.g., as soon as the user's fingers are removed and no longer in contact with the touch-screen display.

Figure 3B:
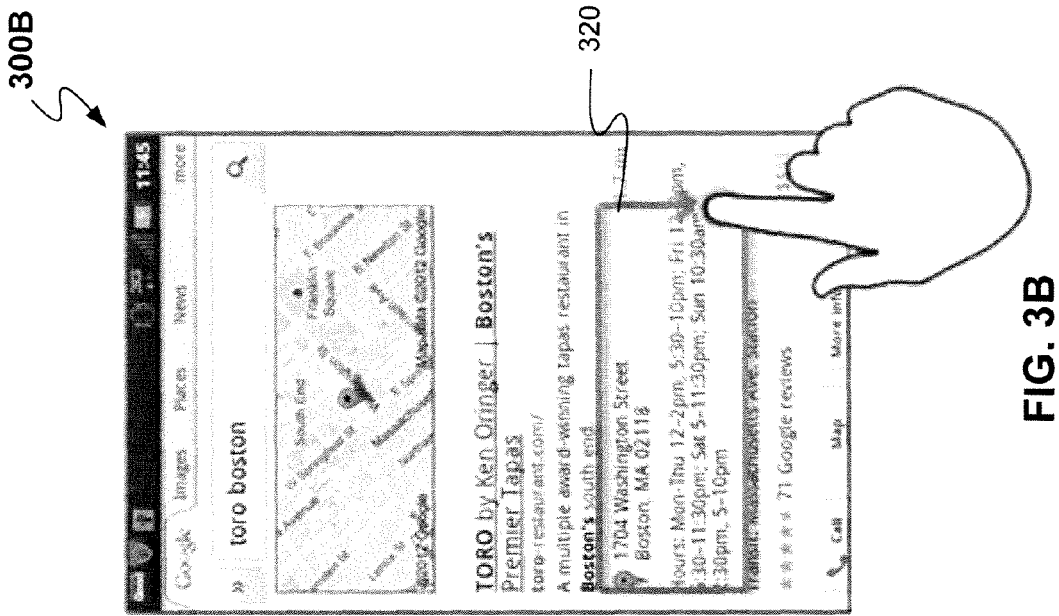
FIGS. 3A-3B illustrate different views of the exemplary graphical user interface for providing various user options for selected content, including a user option for manually specifying a content selection region using touch gestures.
Figure 3A:
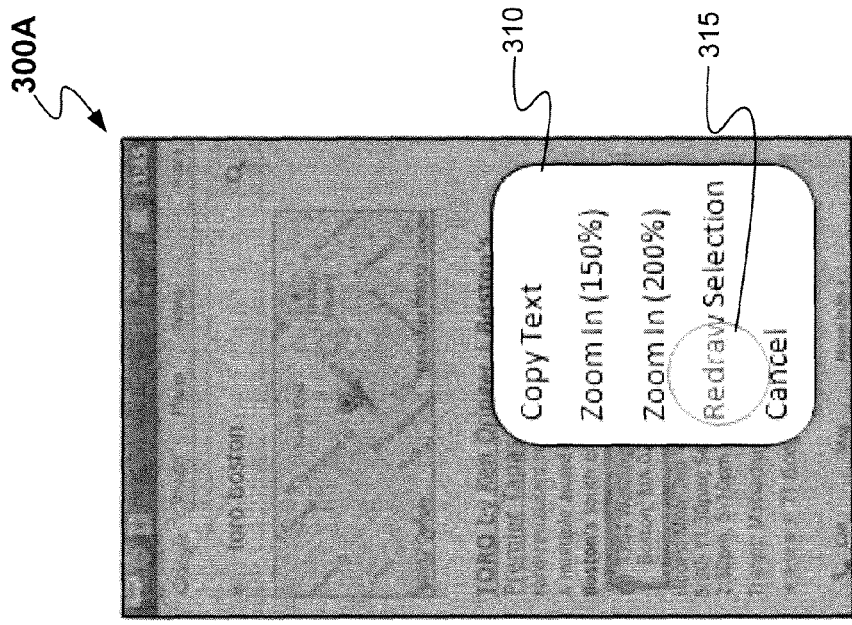

FIGS. 3A and 3B illustrate different views of a GUI 300 for providing various user options related to the content displayed in the area of the touch-screen display corresponding to selection region 210 of GUI 200B of FIG. 2B, as described above. As shown in FIGS. 3A and 3B, the different views are represented by a GUI 300A and a GUI 300B, respectively. For example, GUI 300A and GUI 300B may correspond to different steps in a user process flow for redrawing a selection region after an automatic content selection region 210 has been drawn on the touch-screen display, as described above.

As shown in FIG. 3A, GUI 300A displays a context menu 310 that provides a number of different user-selectable options corresponding to various functions related to the selected content, e.g., as displayed within content selection region 210 of FIG. 2B, as described above. The particular user options of context menu 310 may be based on, for example, the type of selected content appearing within the content selection region. As the selected content in this example includes text content, the first option of context menu 310 is for copying at least a portion of this content to a virtual clipboard, e.g., as part of a copy and paste function of the application or mobile device. As described above, in some cases, the selected content included within content selection region 210 may include only part of a content item (e.g., part of a hyperlink or URL) depending on the approximated boundary, size and location of content selection region 210. In such cases, the user's selection of this first option of context menu 310 may cause only the portion of the content item included within the content selection region 210 (e.g., as displayed within the boundary thereof) to be copied to the virtual clipboard mentioned above. Alternatively, the content item as a whole (e.g., the entire hyperlink/URL) may be copied, even though only a portion of the content item appears within the selection region drawn by the user. In a further example, a predetermined minimum threshold percentage of the content item may be required to be within the selection region in order for the size of content selection region 210 to be adjusted.

It is noted that the subject technology is not limited to text content and that the present techniques are applicable to other types of content (e.g., image or graphics content displayed via the touch-screen display). It is further noted that the subject technology is not limited to copy and paste functions and may be used with any of the various functions as appropriate for the type of content within the selection region. For example, for image content included within content selection region 210, context menu 310 may include user options for downloading or storing a copy of the image content as a file in a local data store of the user's device or sending the image as an attachment via a text messaging or electronic mail application executable at the device. Further, while not shown in FIG. 3A, the user options provided via context menu 310 may include additional options including, but not limited to, an option for a zoom-out function to decrease the zoom level (e.g., to 50% of the current zoom level) at which the content is currently being displayed by GUI 300A. Alternatively, such additional options may be provided within a separate context menu (not shown) displayed by GUI 300A.

Also, as shown in FIG. 3A example, context menu 310 may be displayed as a popup window or dialog region that is presented as an overlay relative to the content already being displayed. In addition to the option for copying the content within the automatically drawn selection region, as described above, other user options are provided for various other functions. Such functions include, for example and without limitation, increasing or enlarging the size of the displayed content according to different zoom levels. As noted above and as will be described further below in reference to FIGS. 4A and 4B, the zoom level is increased such that only the size of the selected content (e.g., appearing within the boundaries of the selection region 210 of FIG. 2B) is enlarged, without enlarging all of the content that may be displayed with respect to the screen as a whole. This allows the selected content to be viewed and selected easily by the user, without losing perspective with respect to the content displayed on the touch-screen display as a whole.

Also, as shown in FIG. 3A, the user options may also include a user option 315 for the user to manually specify (or "redraw") the automatically drawn or visualized content selection region (e.g., selection region 210 of FIG. 2B, as described above) using touch gestures via the touch-screen display. As shown in the example of FIG. 3B, selecting option 315 enables the user to use touch gestures to draw a new selection region 320. Such a redraw option may be useful when, for example, the automatically drawn selection region does not include the desired content of interest to the user. The touch gesture for manually drawing selection region 320 may include, for example, placing the user's finger (or stylus) at a starting point on the touch-screen display of the mobile device for a predetermined time period and while maintaining contact with the touch-screen, moving the user's finger across the touch-screen along path corresponding to an outline or boundary of the new selection region. The user may draw selection region 320 by, for example, using a touch gesture for drawing a rectangle shape encompassing the portion of the displayed content that the user is interested in selecting. The size of the region is specified based on how large the user draws the region within the content display area of the touch-screen display. In some implementations, the size of the region may be limited to only the content viewing or display area of the screen.

It is noted that selection region 320 is provided by way of example only and that the subject technology is not limited to rectangular or square-shaped selection regions. In a different example, the user may draw a selection region having a different shape (e.g., circle, triangle, etc.). Due to the shape of the selection region in this example, the region may encompass only parts of a content item (e.g., only part of an image or a few text characters of a word). Consequently, user options for certain functions (e.g., copy image) may be appropriate only for whole content items within the selection region and any other content item, for which only a part appears within the selection region, may be ignored. In some implementations, an error or warning notification may be displayed to the user if, for example, the user tries to invoke a user option for a function that may not be relevant for the selected content item(s) within the selection region. Alternatively, as described above, such a user option or function may be applied automatically to only a portion or the content item as a whole (e.g., an entire image embedded within a document or web page), even though only a portion of the content item appears within the selection region drawn by the user. Also, as described above, in cases where the entire content item does not appear within the selection region, a predetermined minimum threshold percentage may be used to require that a certain percentage of the content item appear within the selection region in order for any functions to be applied to the item as a whole. This may allow the size of the content selection region to be adjusted and redrawn to include any portions of content that may have been inadvertently excluded by the redrawn boundary of selection region 320.

Once the new selection region is drawn (e.g., selection region 320 of FIG. 3B), a new context menu 410 including user options is drawn for the new selection region, as shown in GUI 400A of FIG. 4A. As described above with respect to FIG. 3A, the user options in this example enable the user to invoke functions including, but not limited to, copying at least a portion of text content appearing within the selection region, increasing the size of the selected content according to various zoom levels (e.g., increasing to a zoom level of 150% or 200% of the original size of the displayed content), redrawing the selection region again, and canceling the selection. The zoom levels may be, for example, predefined by the particular operating system of the user's device (e.g., mobile device 100 of FIG. 1, as described above). Alternatively, the zoom levels may be set by the particular application program executable at the device, which provides the flexible content selection functionality for the user. It should be noted that the above-listed options are provided by way of example and that additional user options may be provided as desired for a particular implementation or particular functions (e.g., a function to share selected content via email, a zoom-out function, a cut and paste function, etc.).

Upon selecting a user option 415 for invoking a zoom-in function, as shown in 4A, the content within the selection region (e.g., selection region 320 of FIG. 3B) is displayed at a specified zoom level (e.g., at 150% of the original or default display size). As shown in GUI 400B of FIG. 4B, the selected content is displayed in a separate control window 420, e.g., in the form of a popup or dialog window overlaid onto a portion of the content display area of the touch-screen display. For example, window 420 may be displayed within a portion of the content area so as to be near the location of the displayed content of the selection region. In some implementations, the user may use touch gestures to reposition or move window 420 to different areas or locations within the content display area of the touch-screen as desired. The user also may use a predefined touch gesture to close or remove the displayed window 420 from the touch-screen display. Such a touch gesture may be the same as the touch gesture for closing windows generally, e.g., as predefined by the particular operating system or application program executable at the user's device. For example, the touch gesture may involve touching any area of the content display area of the touch-screen display at which window 420 is not being displayed. However, it should be noted that any number of well-known techniques may be used for enabling the user to close window 420 or deactivate the flexible content selection functionality described herein. In a different example, GUI 400B may provide one or more control buttons or other user interface control (not shown), which the user can select via the touch-screen display for purposes of either deactivating the flexible content selection functionality or closing individual windows or context menus that are being displayed within the content display area.

As described above, only the content in the selected area of interest (e.g., within selection region 320) is enlarged. In contrast with conventional solutions, the touch-gesture based flexible selection techniques described herein provide a relatively more efficient and easier way for mobile device users to select and view only the specific content of interest without enlarging all of the content being displayed. For example, these techniques enable users to enlarge the content of interest while still viewing other relevant content displayed on the touch-screen display at the same time (e.g., a map showing the location of the restaurant). Further, as described above, the user may select a portion of the enlarged content, for example, in order to invoke a copy and paste function. In some implementations, another context menu including user options for the selected portion of the enlarged content may be displayed in a new popup window or dialog box within the content display area of the touch-screen display. Although not shown in FIG. 4B, this new context menu window may be displayed as, for example, another overlay within the display area in addition to window 420 displaying the selected content at the increased zoom level.

As shown by the above discussion, functions relating to the flexible content selection capability may be implemented on a mobile device of a user, as shown by mobile device 100 of FIG. 1 and described above. However, as noted previously, such functions are not limited thereto and that such functions also may be implemented using any general-purpose computing device including, for example and without limitation, a personal desktop computer or workstation device communicatively coupled to a touch-screen display device for receiving or detecting user input.

A general-purpose computer with data processing and communications capabilities typically comprises a central processor or other processing device, an internal communication bus, various types of memory or storage media (RAM, ROM, EEPROM, cache memory, disk drives etc.) for code and data storage, and one or more network interface cards or ports for communication purposes. Software functionalities related to the flexible content selection capability described herein involve programming, including executable code as well as associated stored data, as described herein. The software code is executable by the general-purpose computer. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for providing the flexible content selection capability, in essentially the manner performed in the implementations discussed and illustrated herein.

Figure 5:
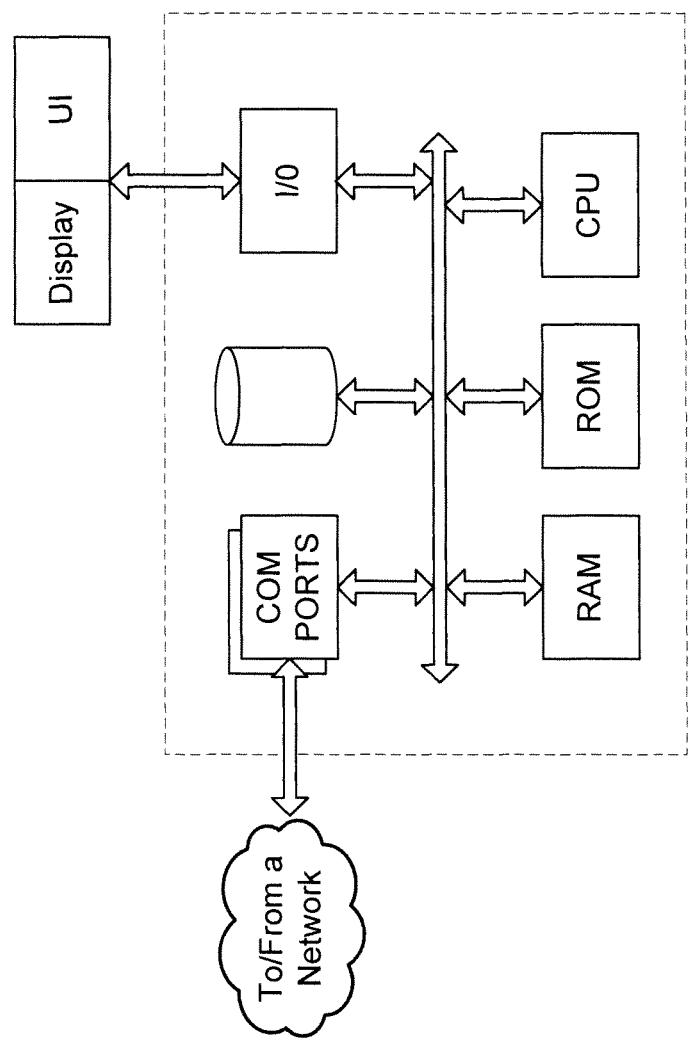
FIG. 5 is a simplified functional block diagram of an exemplary personal computer or other work station or terminal device.

FIG. 5 depicts a computer with user interface elements, as may be used to implement a personal computer or other type of work station or terminal device. It is believed that the general structure, programming and general operation of such computer equipment are well-known and as a result the drawings should be self-explanatory. A computer or computing device, for example, includes a data communication interface for packet data communication. The computer also includes a central processing unit (CPU), in the form of one or more processors, for executing program instructions. As shown in FIG. 5, the computing platform typically includes an internal communication bus, program storage and data storage for various data files to be processed and/or communicated by the computer, although the computer often receives programming and data via network communications. Such computers may use various conventional or other hardware elements, operating systems and programming languages. Of course, the computer functions may be implemented in a distributed fashion on a number of similar platforms, to distribute the processing load.

Hence, aspects of the flexible content selection functionality, as described above, may be embodied in programming. Program aspects of the technology may be thought of as "products" or "articles of manufacture" typically in the form of executable code or process instructions and/or associated data that is stored on or embodied in a type of machine or processor readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a web application/service provider into the computer platform of the application or web server that will be hosting the web application/service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer' or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the flexible content selection capability as described above. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving user input via a touch-screen display of a mobile device, the received user input including a plurality of touch points detected within a first content display area of the touch-screen display;

responsive to the received user input, determining a relative location of each of the plurality of detected touch points with respect to the first content display area of the touch-screen display;

automatically selecting content displayed within a portion of the first content display area of the touch-screen display for a content selection region to be graphically represented within the first content display area, based on the determined relative locations of the plurality of detected touch points by:

approximating a boundary of the content selection region based on the determined relative locations of the plurality of detected touch points;

after approximating the boundary of content selection region, identifying at least one partial content item in which only a part of the identified partial content item is included within the selected content based on the approximated boundary of the content selection region:

in response to identifying the partial content item, determining to adjust a size of the content selection region to include the identified partial content item as a whole based on the identified partial content item being an entire hyperlink in the form of a uniform resource locator (URL) type while continuing to exclude text content that is not part of the entire hyperlink in the content selection region; and in response to determining to adjust the size of the content selection region to include the whole identified partial content item based on the identified partial content item being the entire hyperlink in the form of the URL type, adjusting the content selection region to include the identified partial content item as the entire hyperlink in the form of the URL type in the selected content while continuing to exclude text content that is not part of the entire hyperlink in the content selection region;

graphically presenting the adjusted content selection region in response to the automatic content selection;

displaying a context menu in association with the graphically presented adjusted content selection region via the touch-screen display, the displayed context menu including one or more user options for invoking one or more corresponding functions related to the selected content within the adjusted content selection region, the one or more user options including a zoom option for increasing a zoom level at which the selected content, including the entire hyperlink, is displayed; and upon receiving user input selecting the zoom option from the context menu in association with the graphically presented adjusted content selection region via the touch-screen display:

determining a current zoom level at which the selected content, including the entire hyperlink, is displayed in the first content display area;

graphically presenting a second content display area as a graphical overlay on the first content display area, the second content display area displaying the selected content of the adjusted content selection region at a greater zoom level than the current zoom level and entirely covering the selected content, including the entire hyperlink, that is displayed within the first content display area; and continuing to display the first content display area residing outside of the graphical overlay while maintaining the current zoom level of the first content display area residing outside of the graphical overlay.

2. The method of claim 1, wherein the content selection region is graphically presented in the first content display area of the touch-screen display by delineating the selected content using a boundary.

3. The method claim 2, wherein the content selection region is graphically presented in the first content display area as a box shape with the plurality of detected touch points at opposite ends of the box shape.

4. The method claim 2, further comprising:
determining the size and a shape of the boundary based on the determined relative locations; and
wherein the automatically selected content of the content selection region is selected for inclusion based on the determined size and the shape of the boundary.

5. The method claim 4, further comprising:
adjusting the boundary to cover a second identified partial content item as a whole when a part of the second identified partial content item covered by the boundary is above a predetermined percentage relative to the second identified partial content item as the whole.

6. The method claim 2, further comprising:
upon receiving user input invoking a first user option of the one or more user options for a second content item, determining whether a shape of the content selection region encompasses only a part of the second content item;
determining whether the first user option is only appropriate for a whole of the second content item; and
upon determining the first user option is only appropriate for the whole second content item, displaying an error notification indicating the first user option invoked is not relevant to the second content item.

7. The method of claim 1, wherein the one or more user options are based on a type of the selected content of the content selection region.

8. The method of claim 1, wherein determining the relative locations further comprises:
determining whether each of the plurality of touch points have been detected for at least a predetermined time period, wherein the selecting, graphically presenting and displaying steps are performed only after determining that each of the plurality of touch points have been detected for at least the predetermined time period.

9. The method claim 8, further comprising:
after determining whether each of the plurality of touch points have been detected for at least the predetermined time period:
detecting a spacing between the detected plurality of touch points; and
invalidating user input when the spacing between the detected plurality of touch points are spaced apart less than a predetermined minimum distance, thereby ignoring touch points detected as a result of incidental contact.

10. The method claim 9, further comprising:
after graphically presenting the second content display area as the graphical overlay on the first content display area, detecting user input outside of the graphical overlay via the touch-screen display of the mobile device; and in response to detecting the user input outside of the graphical overlay, closing the graphical overlay to deactivate the content selection region.

11. The method of claim 1, wherein the displaying step comprises:
upon graphically presenting the content selection region, receiving an indication from a sensor of the touch-screen display that at least one of the plurality of touch points is no longer detected; and
displaying the context menu in association with the content selection region via the touch-screen display, only after the indication has been received.

12. The method of claim 1, wherein the one or more user options include a redraw option for enabling a user to manually specify a new content selection region within the first content display area using touch gestures via the touch-screen display.

13. A portable device comprising:
a touch-screen display;
a processor coupled to the touch-screen display;
a storage device accessible to the processor, the storage device having processor-readable instructions stored therein, wherein execution of the processor-readable instructions by the processor configures the processor to perform functions, including functions to:
receive user input via a touch-screen display of a mobile device, the received user input including a plurality of touch points detected within a first content display area of the touch-screen display;
determine a relative location of each of the plurality of detected touch points with respect to the first content display area of the touch-screen display, in response to the received user input;
automatically select content displayed within a portion of the first content display area of the touch-screen display for a content selection region to be graphically represented within the first content display area, based on the determined relative locations of the plurality of detected touch points by:
approximate a boundary of the content selection region based on the determined relative locations of the plurality of detected touch points;
after approximating the boundary of content selection region, identify at least one partial content item in which only a part of the identified partial content item is included within the selected content based on the approximated boundary of the content selection region;
in response to identifying the partial content item, determine to adjust a size of the content selection region to include the identified partial content item as a whole based on the identified partial content item being an entire hyperlink in the form of a uniform resource locator (URL) type while continuing to exclude text content that is not part of the entire hyperlink in the content selection region; and
in response to determining to adjust the size of the content selection region to include the whole identified partial content item based on the identified partial content item being the entire hyperlink in the form of the URL type, adjust the content selection region to include the identified partial content item as the entire hyperlink in the form of the URL type in the selected content while continuing to exclude text content that is not part of the entire hyperlink in the content selection region;

graphically present the adjusted content selection region in response to the automatic content selection;

display a context menu in association with the graphically presented adjusted content selection region via the touch-screen display, the displayed context menu including one or more user options for invoking one or more corresponding functions related to the selected content within the adjusted content selection region, the one or more user options including a zoom option for increasing a zoom level at which the selected content, including the entire hyperlink, is displayed; and upon receiving user input selecting the zoom option from the context menu in association with the graphically presented adjusted content selection region via the touch-screen display:

determine a current zoom level at which the selected content, including the entire hyperlink, is displayed in the first content display area;

graphically present a second content display area as a graphical overlay on the first content display area, the second content display area displaying the selected content of the adjusted content selection region at a greater zoom level than the current zoom level and entirely covering the selected content, including the entire hyperlink, that is displayed within the first content display area; and continue to display the first content display area residing outside of the graphical overlay while maintaining the current zoom level of the first content display area residing outside of the graphical overlay.

14. The portable device of claim 13, wherein the content selection region is graphically presented in the first content display area of the touch-screen display by delineating the selected content using a boundary, and the graphical bounding box is displayed as an overlay within the first content display area of the touch-screen display.

15. The portable device of claim 13, wherein the one or more user options are based on a type of the selected content of the content selection region.

16. The portable device of claim 13, wherein the processor is further configured to perform a function to:

determine whether each of the plurality of touch points have been detected for at least a predetermined time period, wherein the selecting, graphically presenting and displaying steps are performed only after determining that each of the plurality of touch points have been detected for at least the predetermined time period.

17. The portable device of claim 13, wherein the processor is further configured to perform functions to:

receive an indication from a sensor of the touch-screen display that at least one of the plurality of touch points is no longer detected, after the content selection region is graphically presented; and display the context menu in association with the content selection region via the touch-screen display, only after the indication has been received.

18. The portable device of claim 13, wherein the one or more user options include a redraw option for enabling a user to manually specify a new content selection region within the first content display area using touch gestures via the touch-screen display.

19. The portable device of claim 13, wherein the selected content of the content selection region includes a plurality of content items, and the processor is further configured to perform functions to:

approximate a boundary of the content selection region based on the determined relative locations of the plurality of detected touch points;

identify at least one of the plurality of content items in which only a part of the identified content item is included within the selected content based on an approximated boundary of the content selection region; and determine whether or not to adjust a size of the content selection region to include the identified content item as a whole based on other content items included within the content selection region.

20. The portable device of claim 19, wherein the size of the content selection region is adjusted when a type of an identified content item is determined to be the same as the other content items included within the content selection region.

* * * * *